US011949568B1

(12) United States Patent
Kumar et al.

(10) Patent No.: US 11,949,568 B1
(45) Date of Patent: Apr. 2, 2024

(54) WAN LINK SELECTION FOR SD-WAN SERVICES

(71) Applicant: Juniper Networks, Inc., Sunnyvale, CA (US)

(72) Inventors: Rajneesh Kumar, Bangalore (IN); Sankar Ramamoorthi, San Jose, CA (US); Vijay Sai Ram Paruchuri, Bangalore (IN); Unni Dilip, Bangalore (IN); Bhaskar Jain, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/805,584

(22) Filed: Jun. 6, 2022

Related U.S. Application Data

(63) Continuation of application No. 17/139,695, filed on Dec. 31, 2020, now Pat. No. 11,381,474.

(51) Int. Cl.
*H04L 41/5006* (2022.01)
*H04L 41/0896* (2022.01)
*H04L 41/5009* (2022.01)
*H04L 41/5022* (2022.01)
*H04L 45/64* (2022.01)

(52) U.S. Cl.
CPC ...... *H04L 41/5006* (2013.01); *H04L 41/0896* (2013.01); *H04L 41/5009* (2013.01); *H04L 41/5022* (2013.01); *H04L 45/64* (2013.01)

(58) Field of Classification Search
CPC ............. H04L 41/5006; H04L 41/0896; H04L 41/5009; H04L 41/5022; H04L 45/64

USPC ......................................................... 709/231
See application file for complete search history.

(56) References Cited

U.S. PATENT DOCUMENTS

| 10,897,424 B1 | 1/2021 | Dhanabalan et al. |
| 11,381,474 B1 | 7/2022 | Kumar et al. |
| 2008/0084819 A1 | 4/2008 | Parizhsky et al. |
| 2018/0376325 A1 | 12/2018 | Xu et al. |
| 2019/0386918 A1* | 12/2019 | Iyer ..................... H04L 43/0829 |

(Continued)

OTHER PUBLICATIONS

"Contrail Service Orchestration Administration Portal User Guide," Juniper Networks, Inc. Release 5.0.3, Nov. 7, 2020, 340 pp.

(Continued)

*Primary Examiner* — Karen C Tang
(74) *Attorney, Agent, or Firm* — Shumaker & Sieffert, P.A.

(57) ABSTRACT

In an example, a method includes obtaining, for a software-defined wide area network (SD-WAN) system having a plurality of a wide area network (WAN) links for an SD-WAN service, a first service level agreement (SLA) rule that matches a first application, the first SLA rule having a first priority that indicates a priority of the first application; obtaining, for the SD-WAN system, a second SLA rule that matches a second application, the second SLA rule having a second priority that indicates a priority of the second application; assigning, for the SD-WAN system, the first application and the second application to a first WAN link of the plurality of WAN links; and in response to determining that the first WAN link has violated the first SLA rule that matches the first application, assigning, by the SD-WAN system, the second application to a second WAN link of the plurality of WAN links.

20 Claims, 4 Drawing Sheets

(56) References Cited

U.S. PATENT DOCUMENTS

| | | |
|---|---|---|
| 2020/0162319 A1 | 5/2020 | Szigeti et al. |
| 2020/0274777 A1 | 8/2020 | Liu et al. |
| 2020/0304397 A1 | 9/2020 | Smith et al. |
| 2020/0344163 A1* | 10/2020 | Gupta .................... H04L 45/70 |
| 2020/0367129 A1 | 11/2020 | Raheem et al. |
| 2021/0029019 A1 | 1/2021 | Kottapalli |
| 2021/0092062 A1 | 3/2021 | Dhanabalan et al. |

OTHER PUBLICATIONS

"Contrail Service Orchestration Customer Portal User Guide," Juniper Networks, Inc. Release 5.0.3, Nov. 10, 2020, 761 pp.
Prosecution History from U.S. Appl. No. 17/139,695, dated May 25, 2021 through Mar. 7, 2022, 57 pp.
U.S. Appl. No. 17/139,695, filed Dec. 31, 2020, naming inventors Kumar et al.

\* cited by examiner

WAN LINK SELECTION FOR SD-WAN SERVICES

This application is a continuation of U.S. patent application Ser. No. 17/139,695, filed 31 Dec. 2020, the entire contents of which is incorporated herein by reference.

TECHNICAL FIELD

The disclosure relates to computer networks and, more specifically, to software-defined networking in a wide area network (SD-WAN).

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Network providers and enterprises may use software-defined networking in a wide area network (SD-WAN) to manage network connectivity among distributed locations, such as remote branch or central offices or data centers. SD-WAN extends SDN to enable businesses to create connections quickly and efficiently over the WAN, which may include the Internet or other transport networks that offer various WAN connection types, such as Multi-Protocol Label Switching (MPLS)-based connections, mobile network connections (e.g., 3G, Long-Term Evolution (LTE), 5G), Asymmetric Digital Subscriber Line (ADSL), and so forth. Such connections are typically referred to as "WAN links" or, more simply, as "links." SD-WAN is considered a connectivity solution that is implemented with WAN links as an overlay on top of traditional WAN access, making use of the above or other WAN connection types.

An SD-WAN service enables users, such as enterprises, to use the WAN links to meet business and customer needs. In an SD-WAN environment, low-priority traffic can use the lower-cost Internet-based WAN link(s), while more important traffic can travel across better quality WAN links (such as those provided by an MPLS network). WAN link usage can also be assigned per application. With an SD-WAN solution, an enterprise customer can mix and match cost optimization with SLA requirements as they see fit. Users may expect their applications to experience connectivity having an acceptable level of quality, commonly referred to as Quality of Experience (QoE). The QoE may be measured based on various performance metrics of a link, including latency, delay (inter frame gap), jitter, packet loss, and/or throughput. The user may define desired levels for one or more of the metrics for the QoE that the users expect in service contracts, e.g., service level agreements (SLAs), with the service provider. SLA metrics are typically user configurable values and are derived through trial-and-error methodologies or benchmark test environment versus user experience or realistic best application metrics.

SUMMARY

In general, the disclosure describes techniques for WAN link selection within an SD-WAN system based on available bandwidth for WAN links and/or SLA priorities for SLA rules.

In some aspects of this disclosure, a service orchestrator stores SLA rules that can have associated SLA priorities. For example, a first SLA rule may have a first priority, and a second SLA rule may have a second priority that is a lower priority than the first priority. In this example, the second SLA rule therefore has lower priority than the first SLA rule, while the first SLA rule has higher priority than the second SLA rule. Service orchestrator may configure SD-WAN edges with information to apply the SLA rules.

The SD-WAN system may use SLA priorities for the SLA rules to move higher priority applications (that match higher priority SLA rules) to higher priority links, such as in case of SLA violations. For example, a first SLA rule that matches a first application may have a relatively higher SLA priority, while a second SLA that matches a second application may have a relatively lower SLA priority. In some cases, where both the first application and the second application are placed on a particular WAN link, in response to subsequently determining the first SLA rule is violated, the SD-WAN system may move the second application to a different WAN link, rather than the moving the first application that matches the first SLA rule to a different WAN link. An SD-WAN edge device then switches the first and second applications on WAN links determined by SD-WAN system for the first and second applications.

In another aspect of this disclosure, which may be used in combination with other aspects described herein, the techniques may include selecting WAN links for application based in part on available bandwidths on the WAN links. For example, an SD-WAN system may select a WAN link for an application based in part on available bandwidths on the WAN links for an SD-WAN service that are acceptable based on the SLA for the application. SD-WAN edge devices may obtain link data that indicates bandwidth usage of each of the WAN links, and SD-WAN edge devices may compute the available bandwidth for each of the WAN links. The SD-WAN system may then select WAN links to assign applications based in part on the available bandwidths.

The techniques may provide one or more technical advantages that result in at least one practical application. For example, the techniques may facilitate meeting SLA targets for applications with an SD-WAN service. Higher-priority applications should generally have fewer SLA violations and be prioritized for WAN link placement to take them out of an SLA violated state over and above relatively lower-priority applications, and an SD-WAN service orchestrator applying techniques described herein may facilitate this goal by more frequently satisfying SLA rules with higher priorities. As another example, using the available bandwidth of WAN links as one of the WAN link selection criteria for an application and placing the application to a WAN link that has sufficient bandwidth for the application, and in some cases to a WAN link that has maximum available bandwidth of the otherwise satisfactory WAN links for the application, will tend to reduce SLA violations within the SD-WAN service over existing link selection techniques, for the service orchestrator is less likely when considering available bandwidth to select a link that is near or even over its bandwidth capacity.

In an example, a software-defined wide area network (SD-WAN) system includes a service orchestrator comprising processing circuitry; a first SD-WAN edge device comprising processing circuitry and configured with a plurality of a wide area network (WAN) links to a second SD-WAN edge device, wherein the service orchestrator and the first SD-WAN edge device are configured to: obtain a first service level agreement (SLA) rule that matches a first application, the first SLA rule having a first priority that indicates a priority of the first application; obtain a second SLA rule that matches a second application, the second SLA rule having a second priority that indicates a priority of the second application; assign the first application and the second application to a first WAN link of the plurality of WAN links; and in response to a determination that the first WAN link has violated the first SLA rule that matches the first application, assign the second application to a second WAN link of the plurality of WAN links.

In an example, a software-defined wide area network (SD-WAN) edge device includes configuration data configuring respective interfaces for a plurality of a wide area network (WAN) links to an SD-WAN service; and an SD-WAN application executing on processing circuitry and configured to: obtain a first service level agreement (SLA) rule that matches a first application, the first SLA rule having a first priority that indicates a priority of the first application; obtain a second SLA rule that matches a second application, the second SLA rule having a second priority that indicates a priority of the second application; assign the first application and the second application to a first WAN link of the plurality of WAN links; and, in response to a determination that the first WAN link has violated the first SLA rule that matches the first application, assign the second application to a second WAN link of the plurality of WAN links.

In an example, a method includes obtaining, for a software-defined wide area network (SD-WAN) system having a plurality of a wide area network (WAN) links for an SD-WAN service, a first service level agreement (SLA) rule that matches a first application, the first SLA rule having a first priority that indicates a priority of the first application; obtaining, for the SD-WAN system, a second SLA rule that matches a second application, the second SLA rule having a second priority that indicates a priority of the second application; assigning, for the SD-WAN system, the first application and the second application to a first WAN link of the plurality of WAN links; and in response to determining that the first WAN link has violated the first SLA rule that matches the first application, assigning, by the SD-WAN system, the second application to a second WAN link of the plurality of WAN links.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the text and figures.

DETAILED DESCRIPTION

Figure 1:
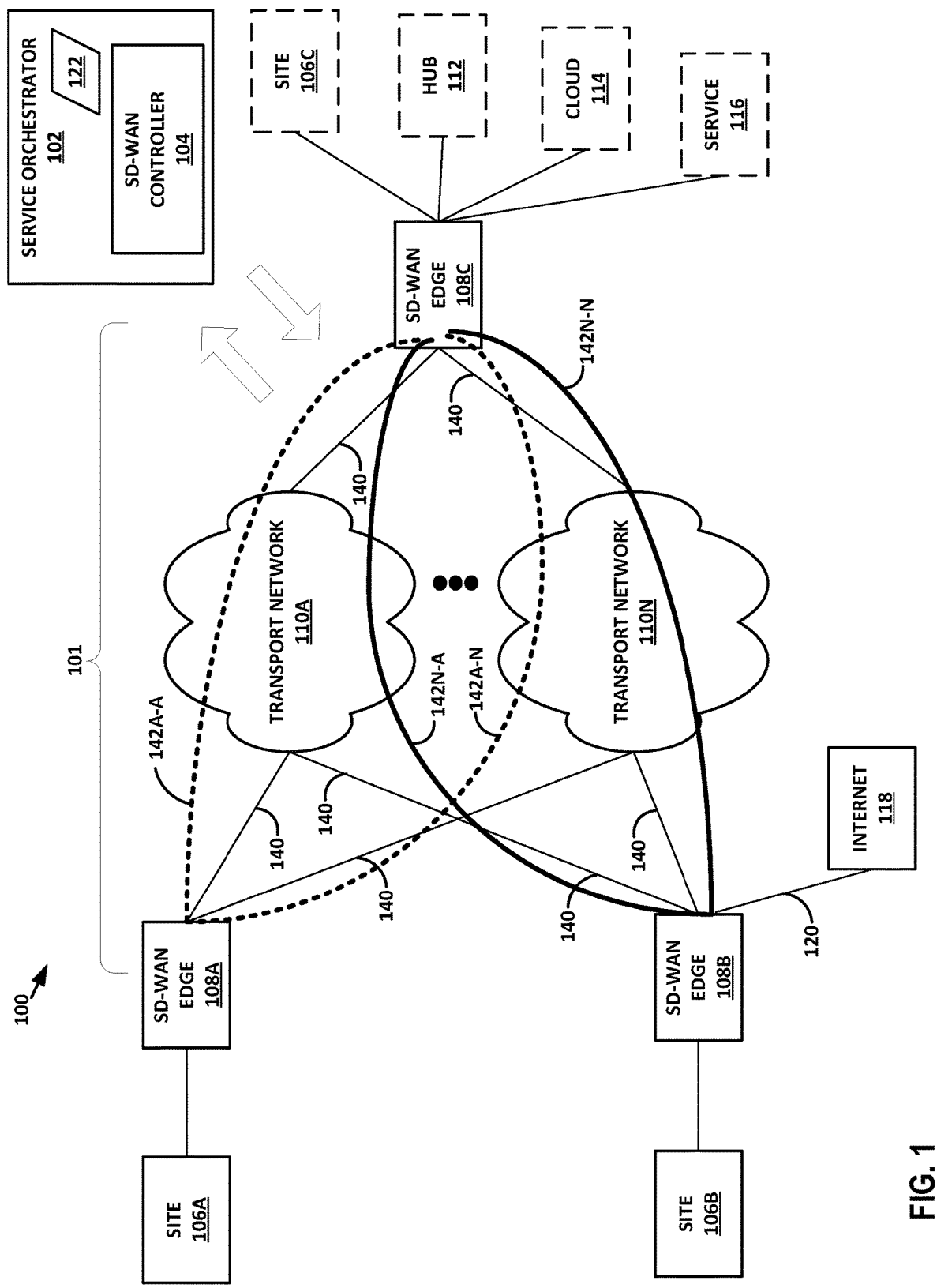
FIG. 1 is a block diagram illustrating an example software-defined wide area network (SD-WAN) system implemented in a network, in accordance with the techniques of this disclosure.

FIG. 1 is a block diagram illustrating an example software-defined wide area network (SD-WAN) system implemented in a network, in accordance with the techniques of this disclosure. SD-WAN system 100 includes transport networks 110A-110N (collectively, "transport networks 110") for connecting sites attached to transport networks and for transporting network traffic between such attached sites. One or more service providers may deploy transport networks 110, which may therefore alternatively be referred to as "service provider networks." Sites attached to service provider networks may be referred to as "subscriber sites." As used herein, the terms "subscriber," "customer," and "tenant" may be used interchangeably.

A service provider uses SD-WAN system 100 to offer an SD-WAN service 101 to its subscribers or organizations authorized by such subscribers, which may include cloud providers, cloud networks, and subscriber partners for instance. SD-WAN service 101 provides a virtual overlay network that enables application-aware, orchestrated connectivity to deliver IP packets between sites associated with a subscriber according to policies. The service provider may offer multiple SD-WAN services.

SD-WAN system 100 includes service orchestrator 102, SD-WAN controller 104, and multiple SD-WAN edge devices 108A-108C (hereinafter, "SD-WAN edges" and collectively, "SD-WAN edges 108") that implement SD-WAN service 101. SD-WAN edges 108 are connected to one another by transport networks 110. Control and ownership of service orchestrator 102, SD-WAN controller 104, SD-WAN edges 108, and transport networks 110 may be distributed among one or more service providers, subscribers, enterprises, or other organizations. However, the SD-WAN service provider uses all of these components to provide the SD-WAN service 101. The SD-WAN service provider may be an enterprise, network/Internet service provider, cloud provider, or other entity.

In general, service orchestrator 102 manages SD-WAN services. Service orchestrator 102 may control, fulfill, configure, monitor usage, assure, analyze, secure, modify, reconfigure, and apply policies to SD-WAN services. Service orchestrator 102 may establish application-based forwarding over transport networks 110 based on security policies, Quality of Service (QoS) policies, QoE policies, and/or business or intent-based policies. Service orchestrator 102 may contain or represent a Network Service Orchestrator (NSO). Service orchestrator 102 has awareness of resources of network system 100 and may enable, for example: tenant site and service management; end-to-end traffic orchestration, visibility, and monitoring; physical network function (PNF) and/or virtual network function (VNF) management; policy and SLA management (PSLAM) to enable SD-WAN functions; routing management for managing routing operations including creating virtual private networks, enabling routing on SD-WAN edges 108, and interfacing to route reflectors and routers; telemetry services that provide interfaces used by fault monitoring and performing monitoring systems for collecting service check results from telemetry agents; and network activation functions to enable device provisioning. At least some of the above functions may be performed by components of a separate or integrated SD-WAN controller 104.

SD-WAN controller 104 may contain or represent a Network Service Controller (NSC). In general, service orchestrator 102 interacts with SD-WAN controller 104 to manage SD-WAN edges 108 to create and operate end-to-end SD-WAN managed services between SD-WAN edges 108 over transport networks 110. SD-WAN controller 104 may provide topology and SD-WAN edge 108 lifecycle management functionality. For example, SD-WAN controller 104 provides PNF/VNF management for SD-WAN edges 108 managed by service orchestrator 102. For example, SD-WAN controller 104 may configure the network configurations of SD-WAN edges 108, configure policies on SD-WAN edges 108, and so forth. SD-WAN controller 104 may monitor statuses and performance data for SD-WAN edges 108 and WAN links 142A-A-142N-N (collectively, "WAN links 142") and provide this information to the service orchestrator 102. In other words, SD-WAN controller 104 may communicate with SD-WAN edges 108 to determine the operational state of WAN links 142 across transport networks 110 and to obtain QoS/QoE performance metrics for WAN links 142. As described in further detail, SD-WAN system 100 may, based on the performance metrics for the WAN links, modify traffic patterns to better meet SLA demands for SD-WAN services in network system 100.

In various examples of SD-WAN system 100, service orchestrator 102 and SD-WAN controller 104 may, for example, be combined to form a single service orchestration platform having separate service orchestration and domain orchestration layers, deployed as separate devices or appliances, or each may be distributed among one or more components executing on one or more servers deployed in one or more locations. Service orchestrator 102 may be a scalable and cloud deployable platform. For example, the service provider for SD-WAN services in network system 100 may deploy service orchestrator 102 to a provider site or to a public, private, or hybrid cloud. As such, operations and functions attributed in this disclosure to service orchestrator 102 may be performed by a separate SD-WAN controller 104, and vice-versa. Aspects of service orchestration and SD-WAN control may also be distributed from service orchestrator 102 and SD-WAN controller 104, respectively, among SD-WAN edges 108 in some example architectures.

Administrators and applications may interface with service orchestrator 102 using northbound interfaces such as RESTful interfaces (e.g., web-based REST APIs), command-line interfaces, portal or graphical user interfaces, web-based user interface, or other interfaces of service orchestrator 102 (not shown in FIG. 1). Service orchestrator 102 may communicate with SD-WAN controller 104 via a southbound interface, which may be a northbound interface of SD-WAN controller, such as RESTful interfaces, command-line interfaces, graphical user interfaces, or other interfaces of service orchestrator 102 (not shown in FIG. 1).

Network links 140 connect SD-WAN edges 108 to transport networks 110. Network links 140 and transports networks 110 make up the underlay network for the SD-WAN service 101 and offer underlay connections between pairs of SD-WAN edges 108. For example, transport network 110A and transport network 110N offer separate underlay connections (not shown in FIG. 1) between SD-WAN edge 108A and SD-WAN edge 108C. The underlay connection may be public or private and may be a network service offering, such as a label switched path (LSP), an Ethernet service, and IP service, a public Internet service, or other service that enables an overlay WAN link. Costs for usage of an underlay connection may be flat-rate or usage-based. Each underlay connection may have a bandwidth limitation, performance metrics (e.g., latency, loss, jitter, and so forth). SD-WAN service 101 may be deployed using underlay connections based on multiple different types of network service. In the example of FIG. 1, for instance, an underlay connection from SD-WAN 108A to SD-WAN edge 108C via transport network 110A may be an LSP for an IP-VPN, while an underlay connection from SD-WAN 108A to SD-WAN edge 108C via transport network 110N may be an IPSec tunnel over the Internet. This diversity may be advantageous for an SD-WAN service by facilitating redundancy and by offering differentiated service capabilities to enable matches between cost/performance and application requirements/SLA for different traffic that uses the SD-WAN service. For example, SD-WAN edge 108A may direct low-cost traffic via the Internet while directing traffic for an application that requires low-latency (e.g., Voice-over-IP) via an LSP. An underlay connection may be created and/or managed by the SD-WAN service provider or by the SD-WAN service 101 subscriber that notifies service orchestrator 102 of the underlay connection. Service orchestrator 102 obtains the link data for WAN links 142, including bandwidth limitations for WAN links 142 (if any). Service orchestrator 102 may obtain the link data from SD-WAN controller 104, receive configuration data that has the link data, or obtain the link data from another network controller or from SD-WAN edges 108. WAN links 142 are described and illustrated as bidirectional, but each of WAN links 142 may represent two separate WAN links, one for each direction.

SD-WAN system 100 illustrates multiple sites associated with a subscriber of the SD-WAN service 101 provider and attached to subscriber-facing interfaces of SD-WAN edges 108. These sites may be referred to as subscriber sites, which make up the subscriber network in that SD-WAN service 101 interconnects the multiple sites to form a single network. Network system 100 in the example of FIG. 1 includes sites 106A-106B and may optionally include any of site 106C, hub 112, cloud 114, or cloud service 116. In some cases, the "subscriber" and the SD-WAN provider are the same entity, as where an enterprise deploys and manages SD-WAN system 100.

Each of sites 106A-106C refers to a subscriber location and may represent, for example, a branch office, private cloud, an on-premises spoke, an enterprise hub, or a cloud spoke. Provider hub 112 represents a multitenant hub device located in a point-of-presence (PoP) on the service provider network. Provider hub 112 may terminate overlay tunnels for overlay networks, which may be of various types such as WIPLS over Generic Route Encapsulation (MPLSoGRE) and MPLSoGRE over IP Sec (MPLSoGREoIPsec) and MPLS over User Datagram Protocol (MPLSoUDP) tunnels. Provider hub 112 may be the hub in a hub-and-spoke architecture for some example deployments of SD-WAN service 101.

Cloud 114 represents a public, private, or hybrid cloud infrastructure. Cloud 114 may be a virtual private cloud within a public cloud. Cloud service 116 is a resource or higher order service that is offered by a cloud service provider to the subscriber over SD-WAN service 101. Cloud service 116 may be, for instance, Software as a Service (SaaS), Platform as a Service (PaaS), Infrastructure as a Service (IaaS), Storage as a Service, or other type of cloud service. Cloud service 116 may be offered by infrastructure of cloud 114.

Internet 118 represents the web and/or an Internet-connected service offered via the web. SD-WAN edge 108B, in this example, includes an Internet breakout 120 and assigns application flows to Internet breakout 120 by policy.

Each of SD-WAN edges 108 includes a physical network function or virtual network function for implementing SD-WAN service 101. In various examples, each of SD-WAN edges 108 may be, for instance, one or more VNFs or a PNF located within any of a service provider data center, provider hub, customer premises, or cloud provider premises. Each of SD-WAN edges 108 may be a router, security device such as a firewall, a gateway, a WAN acceleration device, a switch, a cloud router, a virtual gateway, a cloud virtual gateway, an SD-WAN device, or other device that implements aspects of SD-WAN service 101.

In various examples, each of SD-WANs edges 108 may be an on-premises spoke that is a PNF placed at a subscriber branch site in either a hub-and-spoke or full mesh topology; a cloud spoke that is a VNF located in a subscriber's virtual private cloud (VPC) (or equivalent term) within a public cloud; a PNF or VNF located in a service provider cloud operating as a hub device to establish tunnels with the spoke sites (hub devices are multi-tenant, i.e., shared amongst multiple sites through the use of virtual routing and forwarding instances configured thereon); a PNF or VNF located at an enterprise and operating as an enterprise hub to provide additional hub-like capabilities to a normal spoke site (e.g., act as anchor point for spokes for dynamic virtual private network (VPN) creation, provide an on-premises central breakout option, host a data center department, import routing protocol routes to create a dynamic LAN segment, and meshing with other enterprise hubs that belong to the same tenant/subscriber). Each of SD-WAN edges may be located at the location of any of sites 106, hub 112, cloud 114, or cloud service 116.

SD-WAN edges 108 are logically located at the boundary between the provider SD-WAN service 101 and the subscriber network. SD-WAN edges 108 have network-side interfaces for the underlay connection and subscriber-side interfaces for communication with the subscriber network. As noted above, SD-WAN edges 108 may have multiple paths to each other (diverse underlay connections). For example, in a hub-and-spoke deployment, SD-WAN edge 108A has multiple paths, each via a different one of transport networks 110, to SD-WAN edge 108C of hub 112. Interfaces of SD-WAN edges 108 may primarily be used for underlay connections for user data traffic, but interfaces may also be used for management (Operations, Administration, and Management (OAM)) traffic to, e.g., send performance metrics to service orchestrator 102 and to receive policies, device configurations, and other configuration data from service orchestrator 102.

Service orchestrator 102 may provision and establish overlays tunnels between SD-WAN edges 108 to realize a SD-WAN service 101 topology. In the example of FIG. 1, any of WAN links 142 may be implemented in part using a point-to-point overlay tunnel, e.g., for a virtual private network. Overlay tunnels inherit the performance characteristics of the underlying underlay connection. Overlay tunnels may be encrypted or unencrypted. SD-WAN edges 108 may use any of a variety of encapsulation types, such as MPLS, MPLSoGRE, IP-in-IP, MPLSoUDP, MPLSoGREoIPSec, IPSec, GRE, to implement overlay tunnels.

SD-WAN edges 108 use WAN links 142 to send application traffic across the SD-WAN service 101 to other SD-WAN edges 108. WAN links 142 typically but do not necessarily traverse different underlay connections between SD-WAN edges 108. N WAN links 142A-A-142A-N connect SD-WAN edge 108A and SD-WAN edge 108C. In the example of FIG. 1, each of WAN links 142A-A-142A-N traverses a different one of transport networks 110. Similarly, N WAN links 142N-A-142N-N connect SD-WAN edge 108B and SD-WAN edge 108C, each via a different one of transport networks 110. In a full mesh topology (not shown), additional WAN links would connect SD-WAN edges 108A, 108B. WAN links 142 may also be referred to as "overlay connections," "virtual connections," "tunnel virtual connections," "SD-WAN links," or other terminology that describes WAN links for realizing an SD-WAN service.

Service orchestrator 102 may use SD-WAN controller 104 to deploy SD-WAN service 101 in various architectural topologies, including mesh and hub-and-spoke. A mesh topology is one in which traffic can flow directly from any site 106 to another other site 106. In a dynamic mesh, SD-WAN edges 108 conserve resources for implementing full-mesh topologies. All of the sites in the full mesh are included in the topology, but the site-to-site VPNs are not brought up until traffic crosses a user-defined threshold called the Dynamic VPN threshold. Sites in the mesh topology may include sites 106, cloud 114, and/or cloud service 116. In a hub-and-spoke topology, all traffic passes through hub 112, more specifically, through SD-WAN edge 108C deployed at provider hub 112. By default, traffic to the Internet also flows through provider hub 112. In a hub-and-spoke topology, network services (e.g., firewall or other security services) may be applied at the central hub 112 location, which allows all network traffic for SD-WAN service 101 to be processed using the network services at a single site. SD-WAN service 101 may have a regional hub topology that combines full mesh and hub-and-spoke using a one or more regional hubs that connect multiple spokes to a broader mesh.

In some examples, SD-WAN controller 104 includes a route reflector (not shown) to facilitate routing in SD-WAN service 101. The route reflector forms overlay Border Gateway Protocol (BGP) sessions with SD-WAN edges 108 to receive, insert, and reflect routes.

SD-WAN edges 108 receive ingress network traffic from corresponding subscriber sites and apply SD-WAN service 101 to forward the network traffic via one of the WAN links 142 to another one of SD-WAN edges 108. SD-WAN edges 108 receive network traffic on WAN links 142 and apply SD-WAN service 101 to, e.g., forward the network via one of the WAN links 142 to another one of SD-WAN edges 108 (where the SD-WAN edge is a hub) or to the destination subscriber site.

To apply SD-WAN service 101, SD-WAN edges 108 process network traffic according to routing information, policy information, performance data, and service characteristics of WAN links 142 that may derive at least in part from performance, bandwidth constraints, and behaviors of the underlay connections. SD-WAN edges 108 use dynamic path selection to steer network traffic to different WAN links 142 to attempt to meet QoS/QoE requirements defined in SLAs and configured in SD-WAN edges 108 for SD-WAN service 101, or to route around failed WAN links, for example. For example, SD-WAN edge 108A may select WAN link 142A-A that is a low-latency MPLS path (in this example) for VoIP traffic, while selecting WAN link 142A-N that is a low-cost, broadband Internet connection for file transfer/storage traffic. SD-WAN edges 108 may also apply traffic shaping. The terms "link selection" and "path selection" refer to the same operation of selecting a WAN link for an application and are used interchangeably.

SD-WAN edges 108 process and forward received network traffic for SD-WAN service 101 according to policies and configuration data from service orchestrator 102, routing information, and current network conditions including underly connection performance characteristics. In some examples, service orchestrator 102 may push SLA parameters, path selection parameters and related configuration to SD-WAN edges 108, and SD-WAN edges 108 monitors the links for SLA violations and can switch an application to a different one of WAN links 142. SD-WAN edges 108 may thereby implement the data plane functionality of SD-WAN service 101 over the underlay connections including, in such examples, application switching to different WAN links 142 for application QoE. If there is an SLA violation detected by one of SD-WAN edges 108, the SD-WAN edge may report and send log messages to service orchestrator 102 describing the SLA violation and the selected WAN link. SD-WAN edges 108 may also aggregate, optionally average, and report SLA metrics for WAN links 142 in log messages to service orchestrator 102. In some examples, service orchestrator 102 may receive SLA metrics from SD-WAN edges 108, determine an SLA for an application has been violated, and perform path selection to select a new one of WAN links 142 for the SLA-violated application. Service orchestrator 102 may then configure one or more of SD-WAN edges 108 to switch the application traffic for the application on the new WAN link. SLA metric analysis, SLA evaluation, path selection, and link switching functionality are all performed by SD-WAN system 100, but different examples of SD-WAN system 100 may have a different distribution of control plane functionality between service orchestrator 102 and SD-WAN edges 108 than those examples just described. However, such functionality is described below primarily with respect to SD-WAN edges 108.

SD-WAN edges 108 may forward traffic based on application flows. Packets of application flows packets can be identified using packet characteristics, such as layer 3 and layer 4 (e.g., TCP, UDP) header fields (e.g., source/destination layer 3 addresses, source/destination ports, protocol), by deep packet inspection (DPI), or other flow identification techniques for mapping a packet to an application or, more specifically, an application flow. An application flow may include packets for multiple different applications or application sessions, and a single application may be split among multiple application flows (e.g., separate video and audio streams for a video conferencing application).

SLAs may specify applicable application flows and may include policies for application flow forwarding. SD-WAN edges 108 may identify application flows and apply the appropriate policies to determine how to forward the application flows. For example, SD-WAN edges 108 may use application-specific QoE and advanced policy-based routing (APBR) to identify an application flow and specify a path for the application flow by associating SLA profiles to a routing instance on which the application flow is to be sent. The routing instance may be a virtual routing and forwarding instance (VRF), which is configured with interfaces for the WAN links 142.

QoE aims to improve the user experience at the application level by monitoring the class-of-service parameters and SLA compliance of application traffic and facilitating placement of application data on SLA-compliant WAN links 142 (or the most SLA-compliant WAN link available). Service orchestrator 102 monitors the application traffic for an application for SLA compliance. In some examples, SD-WAN edges 108 (independently or by direction from service orchestrator 102) may move the application traffic from WAN 142 links that fail to meet the SLA requirements to one of WAN links 142 that meets the SLA requirements.

To monitor the SLA compliance of the link on which the application traffic is sent, service orchestrator 102 may cause SD-WAN edges 108 to send inline probes along WAN links 142 (in some cases along with the application traffic already being sent). These inline probes may be referred to as "passive probes." To identify the best available one of WAN links 142 for an application in case the active WAN link fails to meet the SLA criteria, service orchestrator 102 monitors and collects SLA compliance data for other available WAN links 142 for SD-WAN service 101. The probes that service orchestrator 102 sends over other WAN links 142 to check the SLA compliance may be referred to as "active probes." The active probes are carried out based on probe parameters provided in some cases by the subscriber. Active and passive probe measurements are used for an end-to-end analysis of WAN links 142. The data collected by active and passive probing is used for monitoring the network for sources of failures or congestion. If there is a violation detected for any application or group of multiple applications ("application group"), service orchestrator 102 evaluates the synthetic probe metrics to determine a satisfactory, and in some cases best, WAN link 142 that satisfies the SLA. As used herein, reference to an application may refer to a single application or any application group.

Configuring service orchestrator 102 to cause SD-WAN system 100 to apply QoE for SD-WAN service 101 may involve configuring multiple profiles of various profile types that enable the user to parameterize QoE for various applications application groups having traffic transported by SD-WAN service 101. A profile typically includes human-readable text that defines one or more parameters for a function or associates the profile with other profiles to parameterize higher-level functions. In various example, service orchestrator 102 may offer a variety of configuration schemes for parameterizing QoE for SD-WAN service 101.

A subscriber can interact with service orchestrator 102 to create an SLA profile for an application, referred to herein as an "application SLA profile" or simply an "SLA profile." An SLA profile may include SLA configuration data, such as a traffic type profile, an indication of whether local breakout is enabled, a path preference (e.g., an indication of a preferred WAN link of WAN links 142 or type of WAN link (e.g., MPLS, Internet, etc.)), an indication of whether failover is permitted when an active WAN link has an SLA violation of the SLA profile, the criteria for failover (e.g., violation of any SLA parameters or violation of all SLA parameters required to trigger failover).

SLA parameters may be included in an SLA metric profile that is associated with or otherwise part of an SLA profile. Service orchestrator 102 uses SLA parameters to evaluate the SLA of WAN links 142. SLA parameters may include parameters such as throughput, latency, jitter, jitter type, packet loss, round trip delay, or other performance metrics for traffic (which correlate and correspond to performance metrics for a WAN link that carries such traffic). Throughput may refer to the amount of data sent upstream or received downstream by a site during a time period. Latency is an amount of time taken by a packet to travel from one designated point to another. Packet loss may be specified as a percentage of packets dropped by the network to manage congestion. Jitter is a difference between the maximum and minimum round-trip times of a packet.

An SLA profile may further specify SLA sampling parameters and rate limiting parameters. Sampling parameters may include session sampling percentage, SLA violation count, sampling period, and switch cool off period. Session sampling percentage may be used to specify the matching percentage of sessions for which service orchestrator should run passive probes. SLA violation count is used to specify the number of SLA violations after which the service orchestrator should switch to a different one of WAN links 142. Sampling period may be used to specify the sampling period for which the SLA violations are counted. Switch cool off period may be used to specify a waiting period, after which a WAN link switch should happen if an active link comes back online after failure. This parameter helps prevent frequent switching of traffic between active and backup WAN links 142.

Rate limiting parameters may include maximum upstream rate, maximum upstream burst size, maximum downstream rate, maximum downstream burst size, and loss priority. Maximum upstream rate may be used to specify the maximum upstream rate for all applications associated with the SLA profile. Maximum upstream burst size may be used to specify the maximum upstream burst size for all applications associated with the SLA profile. Maximum downstream rate may be used to specify the maximum downstream rate for all applications associated with the SLA profile. Maximum downstream burst size may be used to specify the maximum downstream burst size for all applications associated with the SLA profile. Loss priority may be used to select a loss priority based on which packets can be dropped or retained when network congestion occurs. The probability of a packet being dropped by the network is higher or lower based on the loss priority value.

An application SLA profile may be specified using an SLA rule that includes all required information to measure SLA and to identify whether any SLA violation has occurred or not. An SLA rule may contain the complete probe profiles, time period in which the profile is to be applied, preferred SLA configuration, and other SLA parameters described above (e.g., SLA sample parameters, rate limiting parameters, metrics profile). An SLA rule is associated with an application or application group and to become its SLA profile. In other words, an SLA profile for an application may be a particular SLA rule (e.g., "SLA3") as configured in service orchestrator 102. In some cases, the SLA rule may be associated in this way by association with an APBR rule that is matched to an identified application or application group. As noted above, in some examples, service orchestrator 102 may push SLA parameters, path selection parameters, routing information, routing and interface data, and related configuration to SD-WAN edges 108, and SD-WAN edges 108 monitors the links for SLA violations and can switch an application to a different one of WAN links 142.

SLA violations occur when the performance of a link is below acceptable levels as specified by the SLA. To attempt meet an SLA, SD-WAN system 100 may monitor the network for sources of failures or congestion. If SD-WAN system 100 determines an SLA violation has occurred, SD-WAN system 100 may determine an alternate path to select the best WAN link 142 that satisfies the SLA.

An overlay path includes the WAN links 142 that are used to send the application traffic for an application. SD-WAN system 100 may assign applications to a particular WAN link 142 based on the SLA metrics of the WAN link 142. A destination group is a group of multiple overlay paths terminating at a destination.

In general, service orchestrator 102 configures SD-WAN edges 108 to recognize application traffic for an application, and service orchestrator 102 specifies paths for certain traffic by associating SLA profiles to routing instances by which SD-WAN edges 108 send application traffic to satisfy rules of an APBR profile.

APBR enables application-based routing by service orchestrator 102 that is managing SD-WAN edges 108. An APBR profile specifies matching types of traffic, e.g., by listing one or more applications or application groups. The APBR profile may include multiple APBR rules that each specifies one or more applications or application groups. If network traffic matches a specified application, the rule is considered a match. An SLA rule may be associated with a APBR rule to specify how matching traffic should be handled for QoE. An APBR rule may also specify a routing instance to be used by SD-WAN edges 108 to route traffic matching the APBR rule. The routing instance may have interfaces for one or more WAN links 142. Service orchestrator 102 configures SD-WAN edges 108 with an APBR profile (or configuration data derived therefrom) to cause SD-WAN edges 108 to use APBR in accordance with the APBR profile to implement SD-WAN service 101.

In some examples, SD-WAN edges 108 (e.g., SD-WAN edge 108A) process packets received on an interface to identify the application for the packets. SD-WAN edge 108A may apply an APBR profile to attempt to match the application to an APBR rule therein. If a matching APBR rule is not found, SD-WAN edge 108A forwards the packets normally. If a matching APBR rule is found, however, SD-WAN edge 108A uses the routing instance specified in the APBR rule to route the packets.

A routing instance has associated interfaces for one or more links used by the routing instance to send and receive data. The routing instance, configured in SD-WAN edges 108 and which may be associated with an APBR rule, has interfaces for WAN links 142 to send and receive application traffic. These interfaces may be interfaces for underlay connections.

SD-WAN edges 108 may route traffic using different links based on the link preference determined using SLA rules 122. In some cases, service orchestrator 102 determines application performance on a WAN link of WAN links 142 by computing a score based on latency, round-trip time, jitter, packet loss, and/or other factors. Based on the respective scores for one or more of WAN links 142, service orchestrator 102 and SD-WAN edges 108 may divert application traffic to an alternate WAN link for SD-WAN service 101 if performance of the current link is below acceptable levels as specified by one of SLA rules 122. In some cases, the new WAN links is that WAN link that best serves the SLA requirement, as determined by the score. As already noted, service orchestrator 102 may measure and monitor application performance on WAN links 142 using probes.

In some examples, multiple WAN links 142 may meet SLA requirements for an application. SD-WAN system 100 may select, from these multiple WAN links 142, the WAN link that matches a link preference configured by the user. This preference may be based at least in part on link type and link priority for the WAN links 142. For example, for SD-WAN edge 108A, SD-WAN system 100 may select one of WAN links 142A-A-142A-N that matches the preferred link type (e.g., MPLS) to reach SD-WAN edge 108C. If there are multiple such WAN links 142 with this preference, the WAN link with the highest priority among them is selected. If there is no priority or link type preference configured, then a random path or the default path is selected. If no WAN links 142 that meet the SLA requirements are available, then the best available WAN link in terms of the highest SLA score and link type preference, where strict affinity is configured, is selected. If multiple WAN links 142 that meet the SLA requirements are available, then the one with the highest priority is selected. One or more of the WAN links 142 may be configured with a priority, which may be expressed in the configuration as an integer value that represents the priority. Service orchestrator 102 prefers higher-priority WAN links 142 over lower-priority WAN links 142.

In service orchestrator 102, a user can configure link types (e.g., IP or MPLS) and set priorities for WAN links 142 for an application. For example, the user can define an APBR profile with the WAN links 142 and configure the WAN links 142 with link types/priorities.

By associating an APBR rule specifying an application or application groups with an APBR profile, service orchestrator 102 and SD-WAN edges 108 enforce link preference at the application or application group level to implement SD-WAN service 101. The user may further specify the link type preferences and, in some cases, link-type affinity in an SLA rule. The SLA rule is attached to the APBR rule to associate the preferences with the applications specified in the APBR rule.

Based on the APBR profile, SD-WAN edges 108 match network traffic to applications and application groups specified in the associated APBR rule and may, for example, forward the traffic to the static route and the next-hop address as specified in the routing instance also associated with the APBR rule associated with the APBR profile. SD-WAN system 100 may assign application traffic to a particular path/link based on the configured link type and preference for WAN links 142 and, in some cases, the specified link-type affinity used in the SLA rule (as described above).

The link-type affinity may be strict or loose (optionally the default setting) for a preferred link type. For the strict affinity, SD-WAN system 100 selects a WAN link that is always of the preferred link type. For loose affinity, if there are no WAN links 142 that meet the SLA and belong to the preferred link type, then service orchestrator 102 selects a link that does not have the preferred link type but that otherwise meets the SLA.

Service orchestrator 102 may implement SD-WAN policy intents for SD-WAN service 101 to facilitate better WAN links 142 utilization and efficiently distribute application traffic. A subscriber may set a high-level SD-WAN policy that includes one or more SD-WAN policy intents. Each SD-WAN policy intent may have the following parameters: source, destination, and SLA profile. The source is one or more source endpoints selected from a list of sites, site groups, departments, or a combination thereof. The SD-WAN policy intent is applied to the selected source endpoint. The destination is a destination endpoint selected from a list of applications and predefined or custom application groups. The SD-WAN policy intent is applied to the selected destination endpoint. Applications may be defined using network information (e.g., source or destination prefixes), by protocol, or by application name, for instance. The SLA profile may be defined as described above has the SLA parameters to be applied for the policy intent for which the SLA profile is set.

An SLA rule of SLA rules 122 specifies one or more applications or applications. As used herein, this or other association between an application and SLA parameters for an application mean that the application has an SLA (or SLA rule). If the SLA parameters are violated, the SLA/SLA rule for the application is violated.

In accordance with techniques of some aspects of this disclosure, SD-WAN system 100 may select a WAN link 142 for an application based in part on available bandwidths on the WAN links 142 that are acceptable based on the SLA for the application. For example, SD-WAN system 100 may use probes to obtain performance metrics for each of WAN links 142, as described above with respect to SLA compliance monitoring. SD-WAN system 100 may compute, based on the performance metrics, SLA acceptability for WAN links 142 that can transport network traffic for the application. For example, SD-WAN system 100 may compute scores for WAN links 142 based on the performance metrics. If two or more WAN links 142 that may be used to transport network traffic between two SD-WAN edges 108 have the same, highest score among the WAN links 142 for the SD-WAN service 101, SD-WAN system 100 may select any of these equally high-scoring WAN links 142 that have an available bandwidth sufficient to meet the required bandwidth for the application, which may be estimated or configured. In some cases, SD-WAN system 100 may select the highest-scoring WAN link 142 that has the most available bandwidth. The required bandwidth for an application may be estimated using predictions of a machine learning model trained with existing application sessions for the same application.

SD-WAN system 100 may determine available bandwidth for one of WAN links 142 (e.g., WAN link 142A-A) using a variety of methods. For instance, SD-WAN system 100 may obtain link data that indicates an available bandwidth or a total bandwidth for WAN link 142A-A. SD-WAN controller 104 may provide the link data to service controller 102, which may be obtained in part from SD-WAN edges 108. The link data may be configuration data for the underlay connection of WAN link 142A-A. SD-WAN system 100 may sum required bandwidths for applications placed on WAN link 142A-A and compute the available bandwidth as the difference between the total bandwidth of WAN link 142A-A and the sum of the required bandwidths for the applications placed on WAN link 142A-A.

In accordance with techniques of some aspects of this disclosure, which may be used in combination with other aspects described herein, service orchestrator 102 stores SLA rules 122 that can have associated SLA priorities. For example, a first SLA rule may have a first priority, and a second SLA rule may have a second priority that is a lower priority than the first priority. In this example, the second SLA rule therefore has lower priority than the first SLA rule, while the first SLA rule has higher priority than the second SLA rule. Service orchestrator 102 may configure SD-WAN edges 108 with information to apply the SLA rules 122.

SD-WAN system 100 may use SLA priorities for SLA rules 122 to move higher priority applications (that match higher priority SLA rules) to higher priority links, such as in case of SLA violations. For example, a first SLA rule that matches a first application may have a relatively higher SLA priority, while a second SLA that matches a second application may have a relatively lower SLA priority. In some cases, where both the first application and the second application are placed on a particular WAN link of WAN links 142, in response to subsequently determining the first SLA rule is violated, SD-WAN system 100 may move the second application to a different WAN link of WAN links 142, rather than the moving the first application that matches the first SLA rule to a different WAN link. SD-WAN edges 108 then switches the first and second applications on WAN links 142 determined by SD-WAN system 100 for the first and second applications.

Service orchestrator 102 and SD-WAN edges 108 applying these techniques may therefore facilitate the goal of more frequently satisfying the SLAs of higher-priority applications. Higher-priority applications should generally have fewer SLA violations and be prioritized for WAN link placement to take them out of an SLA violated state over and above relatively lower-priority applications.

This may provide an advantage over other SD-WAN systems in which the service orchestrator only moves, to a different WAN link, application traffic corresponding to applications are in an SLA-violated state ("SLA-violated applications") on their current WAN link. The traffic for other applications on the current WAN link, despite possibly being of lower priority than the SLA-violated applications, remains on the current WAN link.

Again and by contrast, associating priorities with SLA rules (and by extension with matching applications) and considering the SLA rule priority in case of SLA violations may enable more applications to meet SLA performance objectives. For example, consider an SD-WAN service 101 with N links between two sites (e.g., WAN links 142A-A-142A-N between SD-WAN edge 108A and SD-WAN edge 108C) carrying M applications. Assuming similar application traffic loads for each of the M applications and similar bandwidths for each of the N WAN links, SD-WAN system 100 will tend to produce an SD-WAN service 101 having bucketization of traffic across links with MIN load and a dynamic allocation (described in further detail below with respect to FIG. 4). Moreover, high priority WAN links are preferred for high SLA-priority applications, medium priority WAN links are preferred for medium SLA-priority applications, and low WAN links are preferred for low SLA-priority applications. This is merely one example—the number of priorities may be different than the number of WAN links carrying application traffic and may also be different than the number of different WAN link priorities.

Below is an example allocation by SD-WAN system 100 on three WAN links of various priorities:
1. HIGH PRIORITY LINK
   a. Up to 60% HIGH SLA priority applications
   b. Up to 30% MEDIUM SLA priority applications
   c. Up to 10% LOW SLA priority applications
2. MEDIUM PRIORITY LINK
   a. Up to 30% HIGH SLA priority applications
   b. Up to 60% MEDIUM SLA priority applications
   c. Up to 10% LOW SLA priority applications
3. LOW PRIORITY LINK
   a. Up to 10% HIGH SLA priority applications
   b. Up to 30% MEDIUM SLA priority applications
   c. Up to 60% LOW SLA priority applications Because in this aspect of the disclosure, SD-WAN system 100 may dynamically allocate applications to WAN links 142, low and medium SLA priority application may occupy high priority links, and high and medium SLA priority application may occupy low priority links, and so forth. Thus, at any point during operation, the particular allocation (above percentages) may vary. Initially, when there is no traffic, SD-WAN system 100 may assign lower SLA-priority applications (and SD-WAN edges 108 may direct corresponding application traffic) to high priority WAN links 142. Subsequently, as application traffic for higher SLA-priority applications arrives, SD-WAN system 100 reassigns one or more lower-priority applications to lower-priority WAN links 142. This "trickles down" low priority applications to lower-priority WAN links 142 based on dynamic metric observation for WAN links 142 supporting incoming application traffic. When a higher-priority application ceases sending application traffic, SD-WAN system 100 again can assign new lower-priority applications to higher-priority WAN links 142.

In some examples, SD-WAN system 100 is configured with thresholds for WAN links 142 that specify when SD-WAN system 100 should attempt reassigning applications to a different WAN link. These thresholds may be specified in terms of an absolute bandwidth (or other metric) or a percentage of available bandwidth (or other metric), for instance. A threshold may be associated with an application priority to cause SD-WAN system 100 to reassign, to a different link, applications having that priority when the threshold is met.

For instance, thresholds for WAN link 142A-A (having in this instance a highest link priority) may be specified so as to result in the following "zones", where the thresholds are the boundary values for the zones:
Red: >85%;
Yellow: 60 to 85%
Green: 0 to 60%

Once WAN link 142A-A reaches red zone (e.g., meets a threshold value of 85% of the maximum bandwidth of WAN link 142A-A), then SD-WAN system 100 attempts to reassign one or more lower-priority applications to different WAN links 142A-B-142A-N. SD-WAN system 100 in such examples does not wait until an SLA violation or the bandwidth usage of exceeds the maximum bandwidth of WAN link 142A-A. However, SLA violations may remain the trigger for eviction of a particular application in spite of this thresholding scheme.

Figure 2:
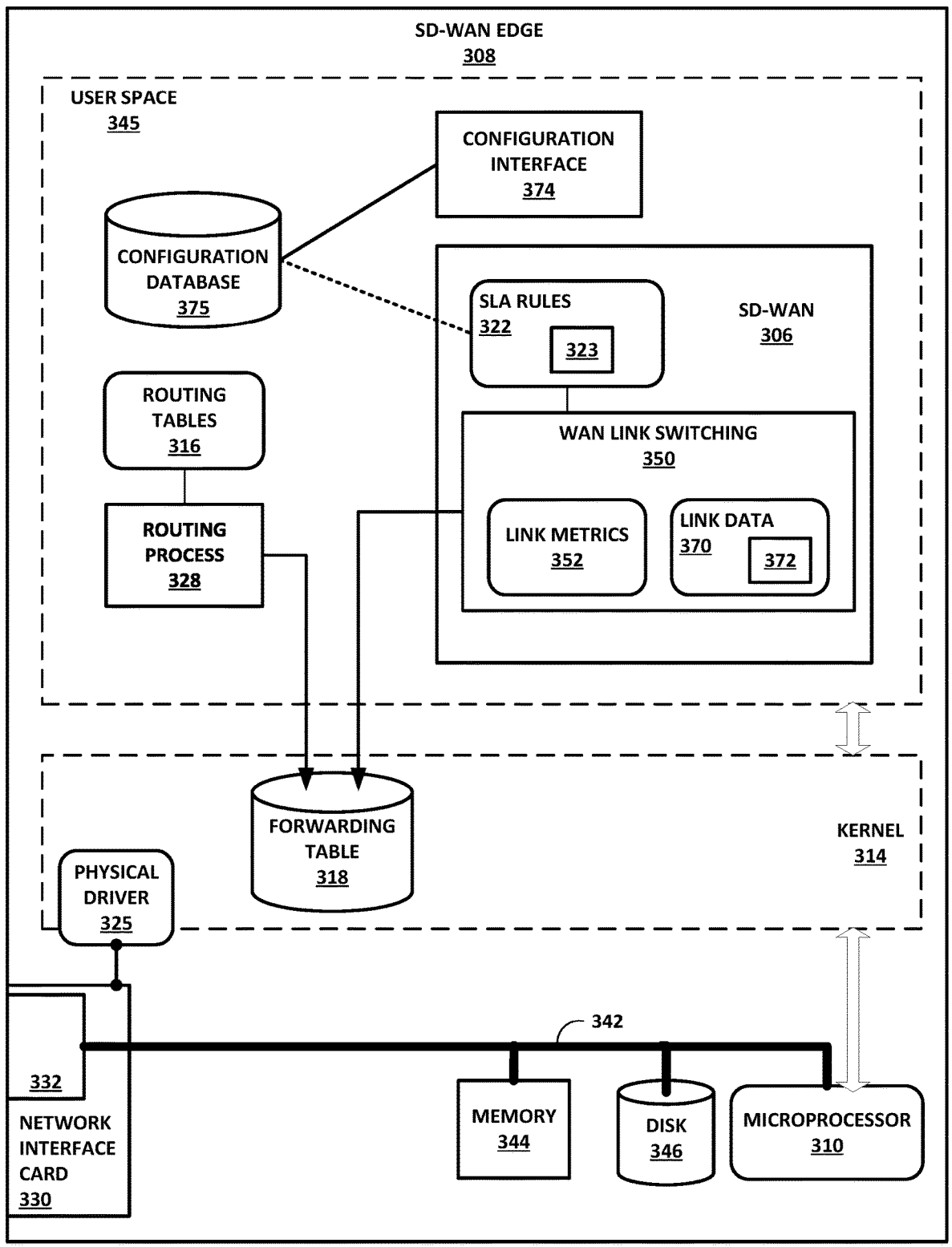
FIG. 2 is a block diagram illustrating an example SD-WAN edge device in further detail, according to techniques described in this disclosure.

FIG. 2 is a block diagram illustrating an example SD-WAN edge device in further detail, according to techniques described in this disclosure. SD-WAN edge device 308 ("SD-WAN edge 308") may represent any of SD-WAN edges of FIG. 1. SD-WAN edge 308 is a computing device and may represent a PNF or VNF. SD-WAN edge 308 may include one or more real or virtual servers configured to execute one or more VNFs to perform operations of an SD-WAN edge.

SD-WAN edge 308 includes in this example, a bus 342 coupling hardware components of a hardware environment. Bus 342 couples network interface card (NIC) 330, storage disk 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory. Interfaces 332 may be interfaces for underlay connections of WAN links configured for SD-WAN application 306 between SD-WAN edge 308 and one or more other SD-WAN edges.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use NIC 330.

The hardware environment and kernel 314 provide a user space 345 operating environment for SD-WAN edge 308 applications, including routing process 328, configuration interface 374, and SD-WAN application 306. Configuration interface 374 enables SD-WAN controller 104 or an operator to configure SD-WAN edge 308. Configuration interface 374 may provide a NETCONF interface, Simple Network Management Protocol (SNMP), a command-line interface, a RESTful interface, Remote Procedure Calls, or other interface by which remote devices may configure SD-WAN edge 308 with configuration information stored to configuration database 375. Configuration information may include, e.g., SLA rules 322 that partially define operation of WAN link switching module 350 for SD-WAN application 306, routes, and virtual routing and forwarding instances (VRFs) configured with interfaces for WAN links, interfaces configurations that specify link type (IP, WIPLS, mobile, etc.), priority, maximum bandwidth, encapsulation information, type of overlay tunnel, and/or other link characteristics.

Routing process 328 executes routing protocols to exchange routing information (e.g., routes) with other network devices and uses the routing information collected in routing table 316 to select the active route to each destination, which is the route used by SD-WAN edge 308 to forward incoming packets to that destination. To route traffic from a source host to a destination host via SD-WAN edge 308, SD-WAN edge 308 learns the path that the packet is to take. These active routes are inserted into the forwarding table 318 of SD-WAN edge 308 and used by the forwarding plane hardware for packet forwarding. For example, routing process 328 may generate forwarding table 318 in the form of a radix or other lookup tree to map packet information (e.g., header information having destination information and/or a label stack) to next hops and ultimately to interfaces 332 for output. In some examples, SD-WAN edge 308 may have a physically bifurcated control plane and data plane in which a switching control card manages one or more packet forwarding line cards each having one or more high-speed packet processors.

SD-WAN edge 308 executes SD-WAN application 306 to implement an SD-WAN service, such as SD-WAN service 101 of FIG. 1. SD-WAN application 306 causes SD-WAN edge 308 to forward traffic based on application flows. SD-WAN application 306 identifies packets of different application flows packets using packet characteristics. Once an application is identified using initial packet(s), information for identifying traffic for application sessions may be stored in flow tables for faster processing. WAN link switching module 350 selects WAN links to assign applications according to routing information, policy information, performance data, and service characteristics of the WAN links for an SD-WAN service implemented by SD-WAN 306. SD-WAN 306 may program forwarding table 318 with selected WAN links for applications, flow table data, or other data for mapping application traffic to a selected WAN link.

In accordance with techniques of an aspect of this disclosure, SD-WAN edge 308 is configured with SLA rules 322 that may include associated SLA priorities 323. SD-WAN edge 308 may use SLA priorities for SLA rules 322 to move (assign) higher priority applications (that match higher priority SLA rules) to higher priority links, such as in case of SLA violations, while reassigning lower priority applications to lower priority links. An example algorithm using SLA priorities in this way is illustrated and described with respect to FIG. 3.

In accordance with techniques of an aspect of this disclosure, SD-WAN edge 308 may select a WAN link for an application based in part on available bandwidths on the WAN links for an SD-WAN service that are acceptable based on the SLA for the application. Each SLA rule of SLA rules 322 may be associated with one or more SLA metrics that determine the SLA for applications that match the SLA rule. Each SLA rule of SLA rules 322 may be associated with probe parameters that cause SD-WAN 306 to issue probes on WAN links for an SD-WAN service to gather link metrics 352 that indicate values of various performance metrics for each of the WAN links. Link data 370 indicates bandwidth usage of each of the WAN links, and SD-WAN application 306 computes available bandwidth 372 for each of the WAN links. To obtain link data 370 for computing bandwidth usage, SD-WAN application 306 may obtain statistics for interfaces 332, such as interface bandwidth usage statistics. WAN link switching module 350 further selects WAN links to assign applications according to available bandwidth 372 for the WAN links. An example algorithm using SLA priorities in this way is illustrated and described with respect to FIG. 4.

Below is an example algorithm for selecting a best WAN link based on available bandwidths (ABW) for a set of WAN links ("overlay links"):

1. Create a candidate set of links which meet the SLA from all overlay links configured for the VRF.
2. Check if the candidate set is empty.
3. If the candidate set is empty, then check the link-type affinity:
   a. If strict affinity is configured, then create subset of all overlay links which meet the link-type preference. Choose the overlay link with the highest SLA score from this subset. If there are multiple such overlay links, select the one with the highest link-priority among them. If there are multiple such highest priority overlay links, then select the one with the highest ABW.
  b. Else if loose affinity, then select the overlay link with the highest SLA score. If there are multiple links with the highest SLA score, then select the overlay link with the highest priority among them. If there are multiple such high priority overlay links, then select the one with the highest ABW.
4. Otherwise, if candidate set is not empty, then create a preferred candidate subset made up of all overlay links meeting the link-type preference from the candidate set.
5. If the preferred candidate subset is empty:
  a. If strict affinity is configured, then go to step 3(a).
  b. Otherwise, if loose affinity is configured, then select the highest priority link in the candidate set. If there are multiple such high priority links in the candidate set, then select the overlay link with the highest ABW.

An example APBR profile apbr1 having a rule that matches an application group and that causes SD-WAN application 306 to implement an SD-WAN service to meet SLAs for the application group defined using an SLA rule that specifies a priority is as follows:

```
profile apbr1 {
  rule rule1 {
    match {
      dynamic-application [SSH, HTTP];
    }
    then {
      routing-instance R1_VPN;
      sla-rule {
        sla1;
      }
    }
  }
}
sla-rule sla1 {
  priority <value>. #0-7 where 0 (lowest priority) is the default value
  desired-bandwidth <value>. #0-10000 Mbps. If not configured, bandwidth feature is disabled.
  preferred-link-type IP; #IP, MEDIUM PRIORITY LINKS, Any
  link-type-affinity strict; #default is loose, i.e., no affinity
  metrics-profile {
    . . .
  }
  active-probe-params {
    . . .
  }
  passive-probe-params {
    . . .
  }
}
```

In this example, SLA rule sla1 for an SD-WAN service is associated with a routing instance named R1_VPN that is defined in configuration database 375. R1_VPN is configured with the WAN links for the SD-WAN service that may be used to transport application traffic, e.g., WAN links 142 for SD-WAN service 101. The priority value of the SLA rule sla1 determines, in part, whether applications that match rule rule1 and therefore have sla1 applied by SD-WAN application 306 will be switched to a different WAN link or whether applications that match SLA rules having differently valued priorities.

An example interface configuration, here used in an APBR, is:
```
edit security advance-policy-based-routing {
  interface ge-x/y/z unit 0 {
    link-type #Custom link type for example ISP1, ISP2, WAN1, WAN2.
      #Default link-type is "IP"
    priority #Configure the priority for selecting this link (e.g., 1-255)
    max-bw #Max bandwidth of the link (e.g., in Mbps).
  }
}
```

The value for max-bw may be used in determining available bandwidth for the WAN link overlaid on the interface.

Figure 3:
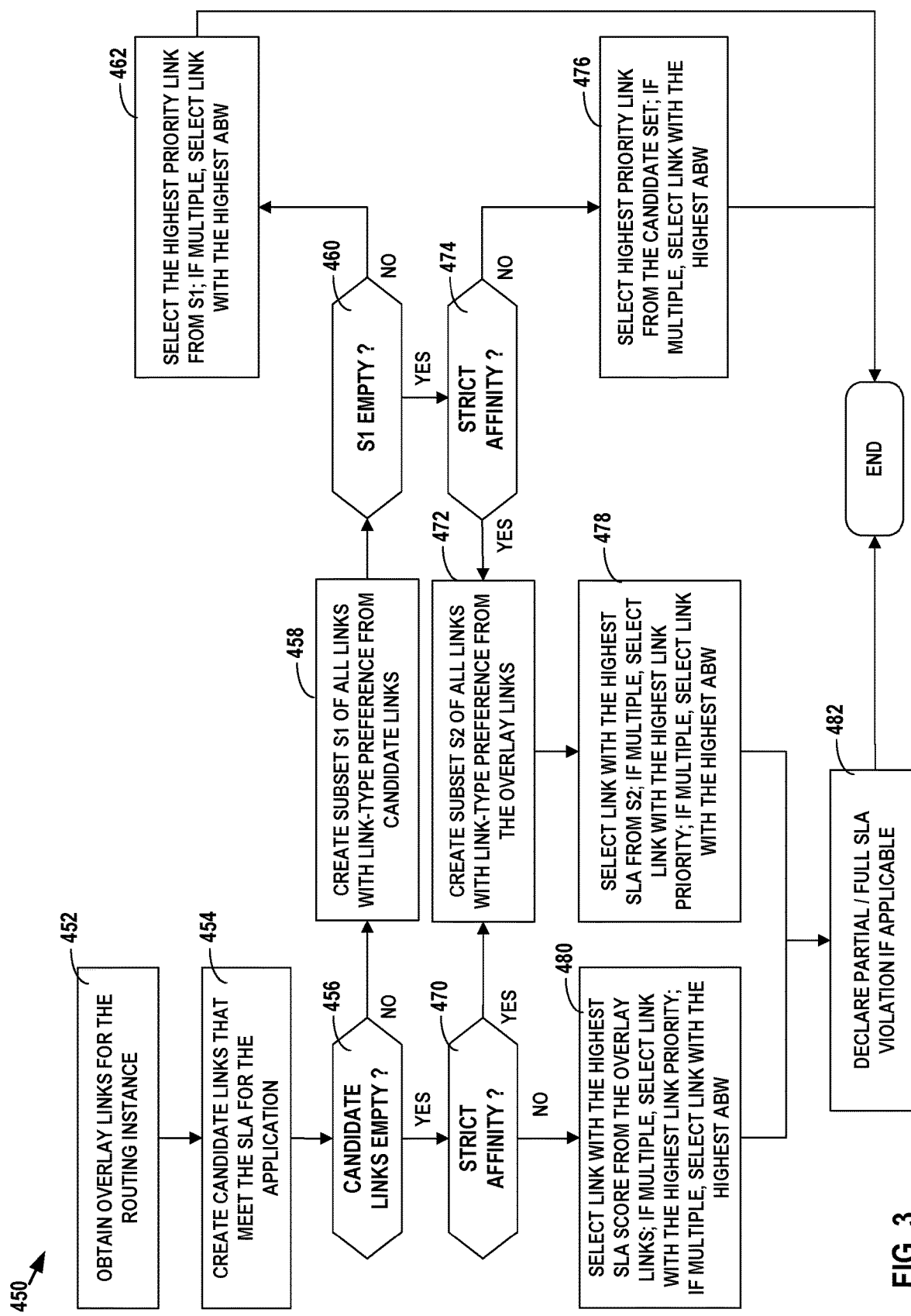
FIG. 3 is a flowchart illustrating an example operation of SD-WAN system to select a WAN link for an application.

FIG. 3 is a flowchart illustrating an example operation of SD-WAN system to select a WAN link for an application. The operation 450 is described with respect to SD-WAN system 100 implementing SD-WAN service 101, but steps of the operation may be performed by any of a service orchestrator, an SD-WAN edge, SD-WAN controller, another other device, or any combination thereof.

The WAN link selection criteria are ordered as follows:
1. WAN link SLA score: The measure of how well the WAN link is satisfying an SLA. Select link with the best SLA score.
2. Link-type preference: Select the preferred types of WAN link first.
3. WAN links with available bandwidth greater than desired bandwidth are preferred.
  a. Where multiple WAN links of the preferred type, select WAN links with desired bandwidth available. In some examples, the largest ABW.
4. WAN link priority
  a. Where multiple WAN links have desired bandwidth, select the WAN link with the highest link priority.

The above WAN link selection criteria are expressed in the operation 450 to perform WAN link selection (path selection) for an application that matches an SLA rule specifying SLAs. SD-WAN system 100 obtains the overlay (WAN) links 142 for the routing instance associated with the SLA rule (452). From the WAN links 142, SD-WAN system 100 creates, based on comparison with link metrics for WAN links 142, from the WAN links 142, a set of candidate links that meet the SLA for the application (454). If the set of candidate links is not empty (NO branch of 456), SD-WAN system 100 creates subset S1 of the WAN links from the set of candidate links that have the preferred link-type for the SLA rule (458).

If subset S1 is not empty (NO branch of 460), SD-WAN system 100 selects the highest-priority WAN links from subset S1; if there are multiple highest-priority WAN links in subset S1, then SD-WAN system 100 selects one of the highest-priority WAN links in subset S1 having ABW and, in some cases, the one having the highest ABW (462). If subset S1 is empty (YES branch of 460), and strict affinity is not specified for the SLA rule (NO branch of 747), then SD-WAN system 100 selects the highest-priority WAN links from the candidate set from step 454; if there are multiple highest-priority WAN links in the candidate set, then SD-WAN system 100 selects one of the highest-priority WAN links in the candidate set having ABW and, in some cases, the one having the highest ABW (476). If subset S1 is empty (YES branch of 460) and strict affinity is specified for the SLA rule (YES branch of 474), SD-WAN system 100 creates subset S2 from all of the WAN links 142 that have the preferred link-type for the SLA rule (472).

Returning to decision step 456, if the set of candidate links is empty (YES branch 456) and strict affinity is specified for the SLA rule (YES branch of 470), SD-WAN system 100 creates subset S2 from all of the WAN links 142 that have the preferred link-type for the SLA rule (472).

Once subset S2 is created, SD-WAN system 100 selects the WAN link with the highest SLA score from subset S2; if there are multiple WAN links having the highest SLA score, SD-WAN system 100 selects one of the highest-scoring WAN links in the subset S2 with the highest link priority; if there are multiple of these, SD-WAN system 100 selects one of the WAN links from this group having ABW and, in some cases, the one having the highest ABW (478).

Returning to decision step 456 once more, if the set of candidate links is empty (YES branch 456) and strict affinity is not specified for the SLA rule (NO branch of 470), SD-WAN system 100 selects the WAN link with the highest SLA score from the candidate links; if there are multiple WAN links having the highest SLA score, SD-WAN system 100 selects one of the highest-scoring WAN links in the candidate links with the highest link priority; if there are multiple of these, SD-WAN system 100 selects one of the WAN links from this group having ABW and, in some cases, the one having the highest ABW (480).

SD-WAN system 100 may report or log a partial or full SLA violation in some cases, e.g., if no preferred link-type meeting the SLA exists (482).

Figure 4:
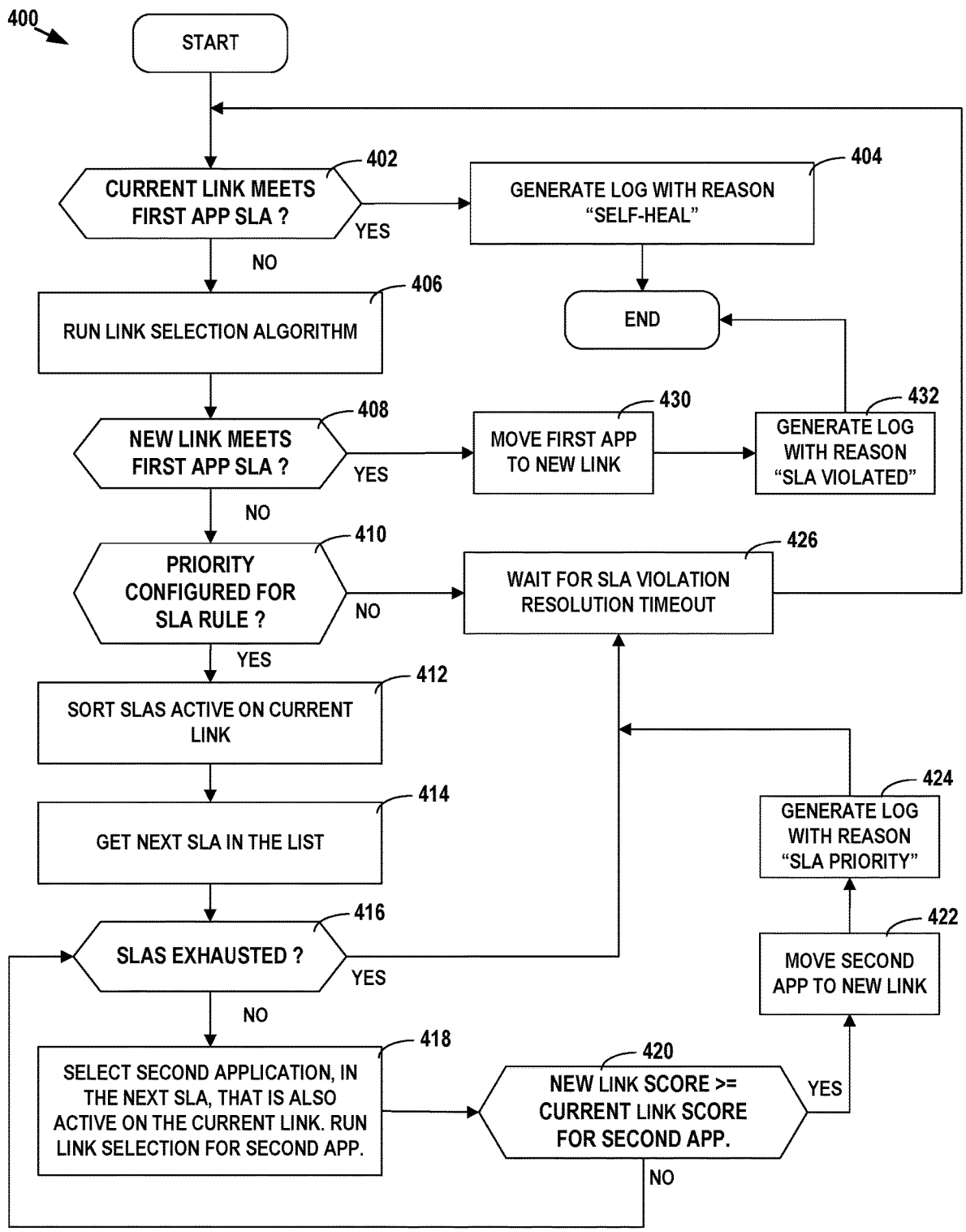
FIG. 4 is a flowchart illustrating an example operation of SD-WAN system to select a WAN link when a WAN link fails to meet the SLA for an application.

FIG. 4 is a flowchart illustrating an example operation of SD-WAN system to select a WAN link when a WAN link fails to meet the SLA for an application. The operation 400 is described with respect to SD-WAN system 100 implementing SD-WAN service 101, but steps of the operation may be performed by any of a service orchestrator, an SD-WAN edge, SD-WAN controller, another other device, or any combination thereof.

SD-WAN system 100 may evict applications from WAN links based on SLA violations. The application eviction criteria are ordered as follows:

1. SLA rule matching application determined to be in SLA-violated state.
   a. Evict lower priority applications in SLA-violated state first. If no such application exists go to next step.
2. SLA priority
   a. Evict low SLA priority level applications (but no applications in SLA-violated state) first. If multiple low SLA priority applications, consider factors below.
3. (configured SLA RTT—current SLA RTT)
   a. This difference value is a measure of how well-placed the application is on its selected WAN link. If the difference value is greater, then the WAN link is the most suitable for this application. If the difference value is lesser, then it is suggestive of impending SLA violation.
   b. Preference to evict applications have least difference values from the link.
4. Link priority
   a. Place the above-evicted applications into WAN links having lower priorities.

As described herein, SD-WAN system 100 allows configuring SLA rule priorities that are used in cases of SLA violations. SLA rules which have higher priority are those with higher need for meeting SLA targets. SD-WAN system 100 first tries to find a better WAN link for an SLA violated application. But if SD-WAN system 100 is not able to find any such WAN link, then SD-WAN system 100 will move other applications that are on the same WAN link but that have lower SLA rule priority (i.e., that match an SLA rule with lower priority). Evicting lower-priority applications in this manner may make the existing WAN link for the original SLA-violated application become SLA compliant for the original SLA-violated application.

Operation 400 first determines an SLA violation, i.e., SD-WAN system 100 determines a current WAN link does not meet an SLA for an SLA rule (matching a first application) assigned to the current WAN link (NO branch of 406). SD-WAN system 100 executes the link selection algorithm (e.g., operation 450), which may exclude the current SLA-violated WAN link from consideration, to select a new WAN link for the application (406).

If the selected WAN link meets the SLA for the SLA rule matching the first application (i.e., meets the SLA for the first application) (YES branch of 408), SD-WAN system 100 reassigns the first application to the selected WAN link (430) and reports or generates a system log to indicate the SLA has been violated (432).

If the selected WAN link does not meet the SLA for the SLA rule matching the first application (NO branch of 408) and no priority is specified for the SLA rule (NO branch of 410) SD-WAN system 100 waits for the SLA violation resolution timeout (426) before restarting the process.

If the selected WAN link does not meet the SLA for the SLA rule matching the first application (NO branch of 408) and a priority is specified for the SLA rule (YES branch of 410) SD-WAN system 100 sorts the SLA rules that are currently assigned to the current link by increasing priority of those SLA rules that have priorities less than that specified for the SLA rule of the first application, to generate a list of sorted SLA rules (412). The least priority SLA would be the first in the list of sorted SLA rules.

SD-WAN system 100 obtains the next SLA rule in the list of sorted SLA rules (414). If there are none (YES branch of 416), SD-WAN system 100 waits for the SLA violation resolution timeout (426) before restarting the process. Otherwise, SD-WAN system 100 selects a second application matching the next SLA rule, that is also active on the current WAN link for the first application, and executes a link selection algorithm (e.g., operation 450) to select a new WAN link (418). If there are multiple such applications matching the next SLA rule, then SD-WAN system 100 may select the second application as the one with the maximum number of sessions. If there are multiple applications with the same maximum number of sessions, then SD-WAN system 100 may select random application from this group.

If the SLA score for the selected, new WAN link is greater than or equal to the current WAN link for the second application (YES branch of 420), SD-WAN system 100 moves the second application to the selected, new WAN link (422) and reports or generates a system log to indicate the SLA priority scheme has been triggered to move the second application (424). If the SLA score is less (NO branch of 420), SD-WAN system 100 returns to step 416. Step 420 is optional, and SD-WAN system 100 may move the second application in some examples even if the SLA score for the new link is less than the SLA score for the current link for the second application.

With respect to step 424, if a path switch for an application happens due to another application on the same WAN link having higher SLA rule priority getting violated, then SD-WAN system 100 may generate a best path selected log or report for that application that would mention the path-switch reason as "sla priority".

In case the SLA violations are resolved because of movement of the lower priority applications, then SD-WAN system 100 may generate a best path selected log or report that indicates the reason for the path-switch as "self-heal". The previous and current destination interface name would be the same and this would indicate that the violations have cleared due to movement of lower SLA rule priority applications.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A software-defined wide area network (SD-WAN) edge device comprising:
configuration data configuring respective interfaces for a plurality of a wide area network (WAN) links to an SD-WAN service; and
an SD-WAN application executed by processing circuitry and configured to:
obtain a service level agreement (SLA) rule that matches an application, wherein the SLA rule specifies a metric and a preferred type of WAN link; and
based on a determination that no links of the plurality of WAN links satisfy the metric specified by the SLA rule and that the SLA rule specifies strict affinity, identify a first set of one or more WAN links, from the plurality of WAN links, having a link type that matches the preferred type of WAN link specified by the SLA rule and assign the application to a WAN link of the first set of one or more WAN links.

2. The SD-WAN edge device of claim 1, wherein to assign the application to the WAN link, the SD-WAN application is configured to assign the application to the WAN link having a highest SLA score among the first set of one or more WAN links.

3. The SD-WAN edge device of claim 1, wherein to assign the application to the WAN link, the SD-WAN application is configured to assign the application to the WAN link having a highest link priority among multiple WAN links having a highest SLA score among the first set of one or more WAN links.

4. The SD-WAN edge device of claim 1, wherein to assign the application to the WAN link, the SD-WAN application is configured to assign the application to the WAN link having a highest available bandwidth among multiple WAN links having a highest link priority and a highest SLA score among the first set of one or more WAN links.

5. The SD-WAN edge device of claim 1, wherein the SD-WAN application is configured to:
based on a determination that no links of the plurality of WAN links satisfy the metric specified by the SLA rule and that the SLA rule specifies loose affinity, assign the application to a WAN link having a highest SLA score among the plurality of WAN links.

6. The SD-WAN edge device of claim 1, wherein the SD-WAN application is configured to:
based on a determination that no links of the plurality of WAN links satisfy the metric specified by the SLA rule and that the SLA rule specifies loose affinity, assign the application to a WAN link having a highest link priority among multiple WAN links having a highest SLA score among the plurality of WAN links.

7. The SD-WAN edge device of claim 1, wherein the SD-WAN application is configured to:
based on a determination that no links of the plurality of WAN links satisfy the metric specified by the SLA rule and that the SLA rule specifies loose affinity, assign the application to a WAN link having a highest available bandwidth among multiple WAN links having a highest link priority and a highest SLA score among the plurality of WAN links.

8. The SD-WAN edge device of claim 1, wherein the SD-WAN application is configured to program a forwarding table to cause the SD-WAN edge device to forward traffic for the application via the WAN link to which the application is assigned.

9. A software-defined wide area network (SD-WAN) system comprising:
a service orchestrator comprising processing circuitry;
a first SD-WAN edge device comprising processing circuitry and configured with a plurality of a wide area network (WAN) links to a second SD-WAN edge device, wherein the service orchestrator and the first SD-WAN edge device are configured to:

obtain a service level agreement (SLA) rule that matches an application, wherein the SLA rule specifies a metric and a preferred type of WAN link; and based on a determination that no links of the plurality of WAN links satisfy the metric specified by the SLA rule and that the SLA rule specifies strict affinity, identify a first set of one or more WAN links, from the plurality of WAN links, having a link type that matches the preferred type of WAN link specified by the SLA rule and assign the application to a WAN link of the first set of one or more WAN links.

10. The SD-WAN system of claim 9, wherein to assign the application to the WAN link the service orchestrator and the first SD-WAN edge device are configured to:

assign the application to the WAN link having a highest SLA score among the first set of one or more WAN links.

11. The SD-WAN system of claim 9, wherein to assign the application to the WAN link the service orchestrator and the first SD-WAN edge device are configured to:

assign the application to the WAN link having a highest link priority among multiple WAN links having a highest SLA score among the first set of one or more WAN links.

12. The SD-WAN system of claim 9, wherein to assign the application to the WAN link the service orchestrator and the first SD-WAN edge device are configured to:

assign the application to the WAN link having a highest available bandwidth among multiple WAN links having a highest link priority and a highest SLA score among the first set of one or more WAN links.

13. The SD-WAN system of claim 9, wherein the service orchestrator and the first SD-WAN edge device are configured to:

based on a determination that no links of the plurality of WAN links satisfy the metric specified by the SLA rule and that the SLA rule specifies loose affinity, assign the application to a WAN link having a highest SLA score among the plurality of WAN links.

14. The SD-WAN system of claim 9, wherein the service orchestrator and the first SD-WAN edge device are configured to:

based on a determination that no links of the plurality of WAN links satisfy the metric specified by the SLA rule and that the SLA rule specifies loose affinity, assign the application to a WAN link having a highest link priority among multiple WAN links having a highest SLA score among the plurality of WAN links.

15. The SD-WAN system of claim 9, wherein the service orchestrator and the first SD-WAN edge device are configured to:

based on a determination that no links of the plurality of WAN links satisfy the metric specified by the SLA rule and that the SLA rule specifies loose affinity, assign the application to a WAN link having a highest available bandwidth among multiple WAN links having a highest link priority and a highest SLA score among the plurality of WAN links.

16. The SD-WAN system of claim 9, wherein the first SD-WAN edge device is configured to program a forwarding table to cause the first SD-WAN edge device to forward traffic for the application via the WAN link to which the application is assigned.

17. A method comprising:

obtaining, for a software-defined wide area network (SD-WAN) system having a plurality of a wide area network (WAN) links for an SD-WAN service, a service level agreement (SLA) rule that matches an application, wherein the SLA rule specifies a metric and a preferred type of WAN link; and based on determining that no links of the plurality of WAN links satisfy the metric specified by the SLA rule and that the SLA rule specifies strict affinity, identifying a first set of one or more WAN links, from the plurality of WAN links, having a link type that matches the preferred type of WAN link specified by the SLA rule and assigning the application to a WAN link of the first set of one or more WAN links.

18. The method of claim 17, wherein assigning the application to the WAN link comprises assigning the application to the WAN link having a highest SLA score among the first set of one or more WAN links.

19. The method of claim 17, wherein assigning the application to the WAN link comprises assigning the application to the WAN link having a highest available bandwidth among multiple WAN links having a highest link priority and a highest SLA score among the first set of one or more WAN links.

20. The method of claim 17, further comprising:

forwarding, by an SD-WAN edge device configured with the plurality of WAN links, traffic for the application via the WAN link to which the application is assigned.

* * * * *